United States Patent
Juang et al.

(10) Patent No.: US 8,406,090 B2
(45) Date of Patent: Mar. 26, 2013

(54) LASER POWER SENSOR FOR THERMALLY ASSISTED MAGNETIC RECORDING

(75) Inventors: Jia-Yang Juang, Santa Clara, CA (US); Timothy C. Reiley, San Jose, CA (US); Timothy C. Strand, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 466 days.

(21) Appl. No.: 12/042,230

(22) Filed: Mar. 4, 2008

(65) Prior Publication Data
US 2009/0225464 A1 Sep. 10, 2009

(51) Int. Cl.
*G11B 11/00* (2006.01)

(52) U.S. Cl. .................................................. 369/13.03

(58) Field of Classification Search ....................... 360/59
See application file for complete search history.

(56) References Cited

U.S. PATENT DOCUMENTS

| | | | | |
|---|---|---|---|---|
| 5,274,622 A | * | 12/1993 | Kono | 369/116 |
| 5,313,444 A | * | 5/1994 | Ishii et al. | 369/13.22 |
| 5,944,882 A | * | 8/1999 | Shinozaki et al. | 106/31.45 |
| 6,205,849 B1 | * | 3/2001 | Schaenzer et al. | 73/105 |
| 6,243,350 B1 | * | 6/2001 | Knight et al. | 369/126 |
| 6,552,980 B2 | * | 4/2003 | Yamazaki | 369/47.5 |
| 6,671,232 B1 | * | 12/2003 | Stupp | 369/13.02 |
| 6,671,248 B2 | * | 12/2003 | Miyabata et al. | 369/116 |
| 6,798,728 B2 | | 9/2004 | Ota et al. | |
| 6,853,657 B2 | * | 2/2005 | Althaus et al. | 372/38.02 |
| 6,950,260 B2 | | 9/2005 | Coffey et al. | |
| 7,077,564 B2 | | 7/2006 | Schloss et al. | |
| 2002/0009105 A1 | * | 1/2002 | Matsumoto | 372/34 |
| 2002/0012205 A1 | * | 1/2002 | Ito et al. | 360/321 |
| 2002/0135940 A1 | * | 9/2002 | Ichikawa et al. | 360/234.5 |
| 2002/0141118 A1 | * | 10/2002 | Nemoto | 360/319 |
| 2004/0008591 A1 | | 1/2004 | Johns et al. | |

(Continued)

FOREIGN PATENT DOCUMENTS

JP 61214266 9/1986

(Continued)

OTHER PUBLICATIONS

Hu et al., "Laser Irradiation and Its Effects on Heat Transfer in Heat Assisted Magnetic Recording", Review of Scientific Instruments 77, 034703, 2006.

(Continued)

*Primary Examiner* — Joseph Feild
*Assistant Examiner* — Henok Heyi
(74) *Attorney, Agent, or Firm* — Kunzler Law Group, PC

(57) ABSTRACT

An apparatus, system, and method for measuring thermally induced electric resistance changes in thermally assisted magnetic recording are disclosed for monitoring laser light output in thermally assisted magnetic recording disk drives. An electrical lead is coupled to a read/write head element. A first electrical resistance in the read/write head element is measured. The read/write head is heated by a laser and a second electrical resistance in the read/write head element is measured. The electrical resistance may be monitored at regular intervals when the read/write head element is on the ramp or the electrical resistance measurements may be continuously monitored as the read/write head flies over the magnetic media.

25 Claims, 10 Drawing Sheets

U.S. PATENT DOCUMENTS

| | | | |
|---|---|---|---|
| 2005/0013034 A1* | 1/2005 | Margulies et al. | 360/59 |
| 2005/0213436 A1 | 9/2005 | Ono et al. | |
| 2005/0265409 A1 | 12/2005 | Tsao et al. | |
| 2006/0117333 A1 | 6/2006 | Taguchi et al. | |
| 2007/0171805 A1 | 7/2007 | Shigeta et al. | |
| 2007/0279791 A1* | 12/2007 | Mallary | 360/69 |
| 2008/0056073 A1* | 3/2008 | Shimizu | 369/13.02 |
| 2009/0196128 A1* | 8/2009 | Lille | 369/13.32 |

FOREIGN PATENT DOCUMENTS

| | | |
|---|---|---|
| JP | 63021887 | 1/1988 |
| JP | 4175616 | 6/1992 |
| JP | 4221438 | 8/1992 |
| JP | 8106669 | 4/1996 |
| JP | 2005122798 | 5/2005 |
| WO | 01/63603 A1 | 8/2001 |

OTHER PUBLICATIONS

Matteo et al., "Spectral Analysis of Strongly Enhanced Visible Light Transmission Through Single C-Shaped Nanoapertures", Applied Physics Letters, vol. 85, No. 4, Jul. 26, 2004.

* cited by examiner

LASER POWER SENSOR FOR THERMALLY ASSISTED MAGNETIC RECORDING

BACKGROUND OF THE INVENTION

1. Field of the Invention

This invention relates to apparatus, systems, and methods for monitoring laser light output in thermally assisted magnetic recording disk drives.

2. Description of the Related Art

Hard-disk drives provide data storage for data processing systems in computers and servers, and are becoming increasingly pervasive in media players, digital recorders, and other personal devices. Advances in hard-disk drive technology have made it possible for a user to store an immense amount of digital information on an increasingly small disk, and to selectively retrieve and alter portions of such information almost instantaneously. Particularly, recent developments have simplified hard-disk drive manufacture while yielding increased track densities, thus promoting increased data storage capabilities at reduced costs.

A typical hard-disk drive will include a stack of disks or "platters" mounted on a common spindle. The surfaces of the disks are typically coated with a material that is magnetized and demagnetized in performing read/write functions. A number of read/write heads may be positioned over the disks as the disks are spun to magnetize portions of the disks to write information thereon or detect the magnetized portions to read information therefrom. A plurality of read/write heads may be used to simultaneously read information from multiple rigid platters that are typically arranged in a vertical stack and rotated as a unit via the spindle.

The read/write heads write information to the disk by creating an electromagnetic field to orient a cluster of magnetic grains, known as a bit, in one direction or the other. In longitudinal magnetic recording media applications, a magnetic recording layer has a magnetic c-axis (or easy axis) parallel to the disk plane. In perpendicular magnetic recording adjustments are being made to adapt the disk media so that the magnetic c-axis of the magnetic recording layer grows perpendicular to the disk plane.

To read information, magnetic patterns detected by the read/write head are converted into a series of pulses which are sent to the logic circuits to be converted to binary data and processed by the rest of the system. To write information on perpendicular recording media, a write element located on the read/write head generates a magnetic write field that travels vertically through the magnetic recording layer and generally returns to the write element through a soft underlayer. In this manner, the write element magnetizes vertical regions, or bits, in the magnetic recording layer.

The read/write heads are typically moved from one track to another by an actuator that is capable of very precise movements. A slider may be interposed between the read/write heads and the actuator in order to provide a degree of flexibility, enabling the read/write heads to "float" on the surface of the disk on a very thin layer of air, or "air bearing," as the disks spin at a very high speed relative to the read/write heads. The combination of slider and read/write head is often referred to as the head-gimbal assembly (HGA).

To increase the capacity of disk drives, manufacturers are continually striving to reduce the size of bits and the grains that comprise the bits. The ability of individual magnetic grains to be magnetized in one direction or the other, however, poses problems where grains are extremely small. The superparamagnetic effect results when the product of a grain's volume (V) and its anisotropy energy ($K_u$) falls below a certain value such that the magnetization of that grain may flip spontaneously due to thermal excitations. Where this occurs, data stored on the disk is corrupted. Thus, while it is desirable to make smaller grains to support higher density recording with less noise, grain miniaturization is inherently limited by the superparamagnetic effect.

Magnetic bit thermal stability is dictated by the equation $K_u V/K_B T$ where $K_u$ is the magnetic anisotropy energy of the magnetic medium, V is the volume of the magnetic grain, $K_B$ is Boltzmann's constant, and T is the absolute temperature. To control the superparamagnetic effect, researchers typically attempt to increase the value of the numerator. Where smaller magnetic grain volume V is desired the magnetic anisotropy energy $K_u$ must be increased to avoid the superparamagnetic effect. However, the increase in $K_u$ is limited by the point where coercivity $H_c$ becomes too great for the media to be written by conventional write heads.

One solution to the problems associated with the superparamagnetic effect is thermally-assisted recording (TAR). In TAR, the volume of a magnetic grain can be reduced while still resisting thermal fluctuations at room temperature. As the name suggests, thermally-assisted recording uses a heat source, typically a laser, to increase the temperature of a magnetic bit during writing such that the coercivity of the magnetic media is substantially reduced. By design the coercivity drops to a level which allows the magnetic field from the write head to orient the bit. Once the temperature is reduced to room temperature, the bit is effectively permanently frozen in the written orientation. This enables the use of media that is magnetically stable at room temperature with the very small magnetic grains required for high-density storage.

Over time, as a laser ages the laser light power decreases. In a typical commercial laser, the laser light power is monitored by a photodiode. However, TAR technology does not utilize currently available commercial lasers with photodiodes because of the added bulk associated with the commercial laser and photodiode. Instead, due to the small size constraints, custom lasers without photo diodes are used in TAR technology. Alternatives to current commercial photodiodes such as a custom photodiode are unpromising because of the added costs and complexity associated with adding another element to the read/write head. Additionally, a photodiode added to the read/write head necessitates additional electrical contact pads on the already limited space on the slider.

Electrically conductive traces or leads extend from the read/write head and along the suspension in order to transport electrical signals from the read/write head components to and from drive electronics. The drive electronics interpret signals from the read/write head in order to retrieve data or send the appropriate signals to the read/write head causing it to write information to the disks. In some hard-disk drive suspensions, the traces are integrated with the suspension in order to provide ease of manufacture and high data rate capability. Such suspensions are referred to as integrated lead suspensions (ILS). A typical ILS has at 4-6 six leads routed from the read/write head to the drive electronics. Thermally assisted recording may require 8 leads routed from the read/write head to the drive electronics (2 for the read head, 2 for the write coil, 2 for a thermal fly height control heater, and 2 for powering the laser). This is a large number of electrical leads disposed on a very small area (the front face of a read/write head can be as small as 0.27×0.78 mm).

In view of the foregoing, it is apparent that a need exists for an apparatus, method, and system for measuring laser light power which does not add additional components or costs to the device. To that end, it would be an improvement in the art to provide an apparatus that utilizes existing elements on the magnetic head to measure laser power.

SUMMARY OF THE INVENTION

The present invention has been developed in response to the present state of the art, and in particular, in response to the problems and needs in the art that have not yet been fully solved by currently available hard-disk drives. Accordingly, the present invention has been developed to provide an apparatus, systems, and methods for monitoring laser light output in thermally assisted magnetic recording disk drives.

In one embodiment in accordance with the invention, the thermally assisted magnetic recording system with a laser power monitor includes a rotational magnetic medium configured to bear perceivable information, an actuator arm, and a slider secured to a distal end of the actuator arm. It further includes a read/write head secured to a distal end of the slider, a laser, and one or more head elements coupled to electrical leads such that the temperature dependent electrical resistance of said head elements can be measured. The thermally assisted magnetic recording system also includes a measurement module coupled to the electrical lead, a determination module, and an interface module. The actuator arm is configured to selectively position the read/write head over the rotational magnetic medium. The laser delivers laser light to a small spot (also known as a "hotspot") on the rotational magnetic medium. A portion of the laser light is absorbed in a head element, typically the write pole, heating said head element. Heat from this element spreads throughout the head. One or more head elements register a measurable electrical resistance change to electricity flowing through the electrical leads and head element in response to a temperature change in the read/write head produced by the laser light. The measurement module is configured to measure the measurable electrical resistance change. The determination module is configured to determine the power level of the laser in response to the measurable electric resistance changes. The interface module is configured to report the power of the laser light in response to a request.

In certain embodiments a write pole will be disposed adjacent to a path of the laser light. The temperature of the write pole will vary in response to the write pole absorbing a portion of the laser light. The heating of the write pole in turn causes the temperature of the other head elements to rise.

In one embodiment a heat pipe may be disposed in thermal communication with the write pole. The heat pipe may be configured to collect heat from the write pole and conduct the heat to a head element to measure the head elements electrical resistance.

In one embodiment in accordance with the invention, the thermally assisted magnetic recording system with a laser power monitor includes a rotational magnetic medium configured to bear perceivable information, an actuator arm, and a slider secured to a distal end of the actuator arm. It further includes, a read/write head secured to a distal end of the slider, a laser, and a heat absorbing sensor with a temperature dependent electrical resistance coupled to an electrical lead or leads. In one embodiment the apparatus further includes a measurement module coupled to the electrical lead, a determination module, and an interface module. The actuator arm is configured to selectively position the read/write head over the rotational magnetic medium. The laser delivers a laser light to a small spot on the rotational magnetic medium. The heat absorbing sensor registers a measurable electrical resistance change to electricity flowing through the electrical lead and heat absorbing element in response to temperature changes produced by the laser light. The measurement module configured to measure the measurable electrical resistance change. The determination module is configured to determine the power level of the laser in response to the measurable electric resistance changes. The interface module is configured to report the power of the laser light in response to a diagnostic test.

In certain embodiments a dielectric waveguide may be disposed within the read/write head. The dielectric waveguide may be configured to propagate the laser light from the laser to a small spot on the magnetic recording media without absorbing heat.

In one embodiment of the current invention, a method for determining a laser power output for thermally assisted recording on magnetic media includes providing an electrically coupled read/write head element coupled to an electrical lead. The method further includes applying an electrical current to the read/write head element and measuring a first electrical resistance at a lead coupled to the read/write head element. A laser generator is signaled to deliver laser light to the laser light waveguide. The read/write head element is heated by one or more elements of the read/write head elements absorbing a tail of the laser light. A second electrical resistance is measured at the lead and the power level of the laser is determined based on an electric resistance change comprising a difference between the first electrical resistance and the second electrical resistance. The power of the laser light is reported as a function of a heat induced electrical resistance change.

In one embodiment in accordance with the invention, the thermally assisted magnetic recording system with a laser power monitor includes a rotational magnetic medium configured to bear perceivable information, an actuator arm, and a slider secured to a distal end of the actuator arm. It further includes a read/write head secured to a distal end of the slider, a laser, and a near-field aperture structure positioned in close proximity to a write pole. The thermally assisted magnetic recording system also includes a measurement module coupled to the electrical lead, a determination module, and an interface module. The actuator arm is configured to selectively position the read/write head over the rotational magnetic medium. The laser delivers laser light to a small spot (also known as a "hotspot") on the rotational magnetic medium. The near-field aperture structure is configured to focus the laser light on a hotspot disposed on the rotational magnetic medium. A portion of the laser light is absorbed by the near-field aperture structure, heating said aperture structure. The near-field aperture structure is coupled to electrical leads such that the temperature dependent electrical resistance of near-field aperture structure can be measured. The measurement module is configured to measure the measurable electrical resistance change. The determination module is configured to determine the power level of the laser in response to the measurable electric resistance changes. The interface module is configured to report the power of the laser light in response to a request.

In certain embodiments of the current invention, transparent material is disposed within a void of the near-field aperture structure and laser light propagates through the transparent material.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Figure 1:
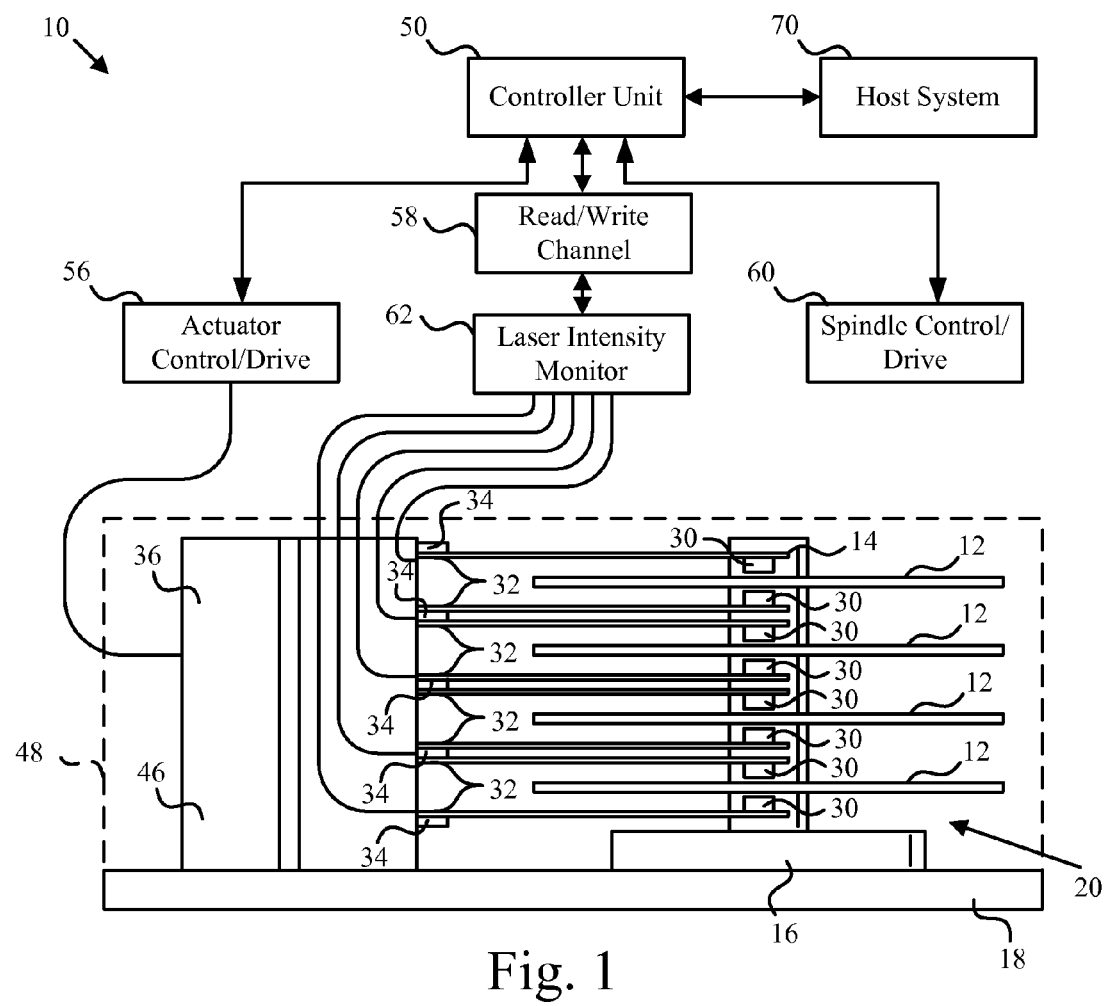
FIG. 1 is a schematic representation of one embodiment of a data storage system in accordance with the present invention.
Figure 2:
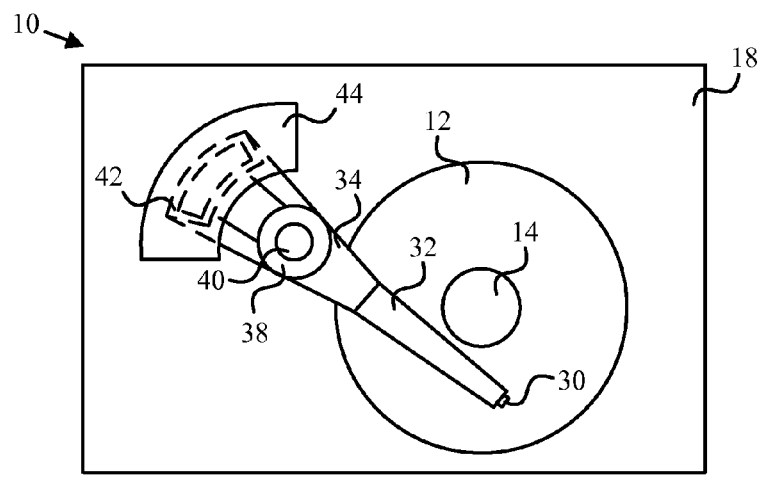
FIG. 2 is a top view illustration of the system of FIG. 1.

FIGS. 1 and 2 show schematic diagrams of one embodiment of a data storage system in which the present invention may be deployed, which is designated by the general reference number 10. The system 10 may include a plurality of magnetic recording disks 12. Each disk 12 may have a plurality of concentric data tracks. The disks 12 are typically mounted on a spindle motor shaft 14, which may connect to a spindle motor 16.

The motor 16 is typically mounted to a chassis 18. The disks 12, spindle 14, and motor 16 form a disk stack assembly 20.

A plurality of read/write heads 30 may be positioned over the disks 12 such that at least one surface of each disk 12 has a corresponding head 30. Each head 30 may attach to one of a plurality of sliders 32. Each slider 32 may have a corresponding actuator arm 34. Sliders 32 are typically connected to a rotary actuator 36. The actuator 36 moves the heads in a radial direction across disks 12. The actuator 36 typically includes a rotating member 38 mounted to a rotating bearing 40, a motor winding 42, and motor magnets 44. The actuator 36 is also mounted to chassis 18. The heads 30, slider 32 and actuator 36 form an actuator assembly 46. The disk stack assembly 20 and the actuator assembly 46 may be sealed in an enclosure 48 (shown by a dashed line), which provides protection from particulate contamination.

A controller unit 50 typically provides overall control to the system 10. The controller unit 50 may contain a central processing unit (CPU), memory unit and other digital circuitry. The controller 50 may connect to an actuator control/drive unit 56 which in turn is connected to the actuator 36. This allows the controller 50 to control the movement of the heads 30 over the disks 12. The controller 50 may be connected to a read/write channel 58 which in turn connects to the laser power monitor 62. The laser power monitor may be connected to the heads 30. This enables the controller 50 to send and receive data from the disks 12 including read/write data and laser output information. The controller 50 may connect to a spindle control/drive unit 60 which in turn is connected to spindle motor 16. This enables the controller 50 to control the rotation of the disks 12. A host system 70, which is typically a computer system, may connect to the controller unit 50. The system 70 may send digital data to controller 50 to be stored on disks 12, or may request the digital data be read from disks 12 and sent to the system 70.

Figure 3:
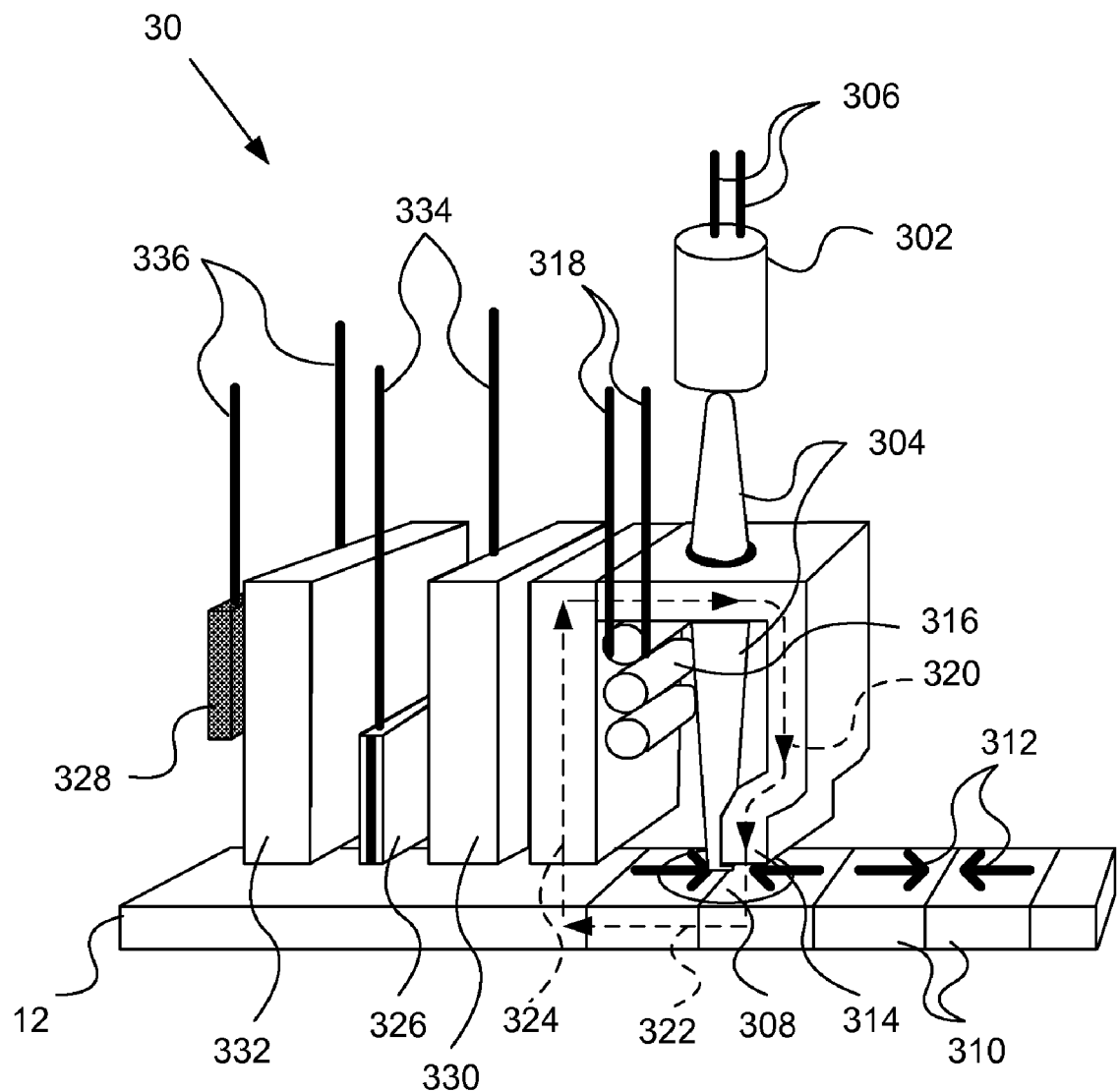
FIG. 3 is a perspective view illustration of an embodiment of a read/write head disposed above a magnetic recording disk in accordance with the present invention.

FIG. 3 depicts an embodiment of a read/write head 30 for use in thermally assisted magnetic recording. Read/write head elements include a write coil 316, write pole 314 and a read element 326. In certain embodiments, read/write head elements may also include a thermal fly height control heater 328. The read/write head 30 may also include a laser 302 configured to emit a laser light 304 and a write pole 314 configured to write data to the magnetic recording disk 12.

The laser 302 is electrically connected to read/write channel 58 by laser electrical leads 306. The read write channel 58 may provide electrical current to the laser electrical leads 306 when the system 70 requires data to be stored on disks 12. The laser light 304 may be configured to heat a hotspot 308 on the magnetic recording disks 12 corresponding to a magnetic bit 310. In certain embodiments, magnetic bits 310 have a higher magnetic anisotropy than magnetic bits used in conventional magnetic recording. Magnetic bits 310 may comprise a plurality of magnetic grains having a field of magnetization 312 that points in a direction substantially horizontal to the magnetic recording disk 12 surface. While FIG. 3 illustrates an embodiment wherein the magnetic recording disk 12 comprises a longitudinal media, one skilled in the art will recognize that the current invention is equally applicable to perpendicular media where the grains each have a magnetic easy axis substantially perpendicular to the media surface, thereby allowing the magnetic grains to be vertically magnetized. Further, one skilled in the art will recognize that the current invention is equally applicable to tilted media wherein the magnetic easy axis of the grains are neither perpendicular nor horizontal to the media surface.

A write pole 314 may be disposed adjacent to the hotspot 304 on the magnetic recording disk 12. The write pole 314 may also be disposed adjacent to the laser light 304 and in certain embodiments, a portion of the laser light 304 may be absorbed by the write pole 314 causing the write pole 314 to heat up. In other embodiments the write pole 314 may be coincident the laser light 304. In yet another embodiment, laser light 304 may be disposed in a channel through the write pole 314.

Write coil 316 is coupled to write coil electrical leads 318. The read write channel 58 may provide electrical current to the write coil electrical leads 318 when the system 70 requires data to be stored on disks 12. In certain embodiments the electrical current provided to the write coil electrical leads 318 may be supplied simultaneously with the current supplied to the laser electrical leads 306 such that both the laser 302 and the write coil 316 are powered when the system 70 requires data to be stored on disks 12.

Applying an electrical current through write coil 316 produces a magnetic field. The direction of the magnetic field produced by the write coil 316 depends on the direction that the current is flowing through the magnetic coil 316. This magnetic field is transferred to the write pole 314 as indicated by arrows 320. A return path 324 returns the magnetic field to the write coil 316. The magnetic recording disk completes the magnetic circuit 322 which, in turn, orients the field of magnetization 312 of the magnetic bit 310 on the magnetic disk 12. Thus, when the system 70 requires data to be stored on disks 12, the laser 302 may be powered to produce laser light 304 to heat the hotspot 308 such that the magnetic anisotropy of magnetic bits 310 is reduced. Simultaneously, the write coil 316 is powered and a magnetic circuit 322 is completed to orient the field of magnetization 312 of the magnetic bits 310. As will be apparent to one skilled in the art, the direction of flow of the magnetic circuit 322, and thus the orientation of the magnetic bits 310 will depend on the direction of flow of the electrical current through the write coil 316.

The write pole 314 is disposed in close enough proximity to the write coil 316 to be influenced by the write coil electrically induced magnetic field. This close proximity between the write pole 314 and the write coil 316 also results in thermal conduction between the write pole 314 and write coil 316. Thus, as the write pole 314 absorbs laser light 304 and heats up, the write coil 316 also heats up. As heat increases in the write coil 316, the electrical resistance to the write coil electrical leads 318 is increased. The laser power monitor 62 may be configured to sense electrical resistance changes in the write coil electrical leads 318. The laser power monitor 62 may be configured to calculate laser power as a function of electrical resistance in the write coil electrical leads 318. In certain embodiments the laser power monitor 62 may report the power of the laser light 304 to the controller unit 50 which in turn may increase or decrease electrical current to the laser. In another embodiment, the laser power monitor 62 may report the power of the laser light 304 to the host system 70 so that appropriate action may be taken such as replacing the laser 302, if needed.

A read element 326 is disposed between a first magnetic shield 330 and a second magnetic shield 332. The magnetic shields 330 and 332 may be configured to shield the read element 326 from the magnetic circuit 322 produced by the write coils 316. In one embodiment the read element 326 may comprise an anisotropic magnetoresistive head. In another embodiment the read element 326 may comprise a giant magnetoresistive head. In one embodiment the read element 326 may comprise a tunnel-type magnetoresistive head. The read element 326 is coupled to read element electrical leads 334 and is configured to produce a change in electrical resistance in response to the magnetic fields 312 of the magnetic bits on the magnetic recording disk 12. The electrical resistance of the read element 326 also changes in response to thermal changes in the temperature of the read element 326. As the temperature rises, the electrical resistance of the read element 326 increases. To read data embedded on the magnetic recording disk 12, the read element 326 may communicate electrical resistance changes to the read element electrical leads 334. The electrical resistance change may be in response to the magnetic fields 312 of the individual magnetic bits 310.

In certain embodiments the read element 326 may be disposed in close enough proximity to the write pole 314 to be heated by the write pole 314. Thus, as the write pole 314 absorbs laser light 304 and heats up, the read element 326 may also heat up. As heat increases in the read element 326, the electrical resistance to the read element electrical leads 334 is increased. The laser power monitor 62 may be configured to sense electrical resistance changes in the read element electrical leads 334. The laser power monitor may be configured to calculate laser power as a function of electrical resistance in the read element electrical leads 334. In certain embodiments the laser power monitor 62 may report the power of the laser light 304 to the controller unit 50 which in turn may increase or decrease electrical current to the laser. In another embodiment, the laser power monitor 62 may report the power of the laser light 304 to the host system 70 so that appropriate action may be taken such as replacing the laser 302.

A thermal fly height control heater (TFC heater) 328 may be provided to maintain a minimum temperature within the read/write head 30. The TFC heater may be coupled to TFC heater electrical leads 336. The electrical resistance of the TFC heater 328 may change in response to thermal changes in the temperature of the TFC heater 328. As the temperature rises, the electrical resistance of the TFC heater 328 increases. The TFC heater 328 communicates electrical resistance changes to TFC heater electrical leads 336 which in turn may communicate the electrical resistance change to the laser power monitor 62.

In certain embodiments the TFC heater 328 may be disposed in close enough proximity to the write pole 314 to be heated by the write pole 314. Thus, as the write pole 314 absorbs laser light 304 and heats up, the TFC heater 328 may also heat up. As heat increases in the TFC heater 328, the electrical resistance to the TFC heater electrical leads 336 is increased. The laser power monitor 62 may be configured to sense electrical resistance changes in the TFC heater electrical leads 336. The laser power monitor may be configured to calculate laser power as a function of electrical resistance in the TFC heater electrical leads 336. In certain embodiments the laser power monitor 62 may report the power of the laser light 304 to the controller unit 50 which in turn may increase or decrease electrical current to the laser. In another embodiment, the laser power monitor 62 may report the power of the laser light 304 to the host system 70 so that appropriate action may be taken such as replacing the laser 302.

In certain embodiments the write coil electrical leads 318, the read element electrical leads 334 and the TFC heater electrical leads 336 are all coupled to the laser power monitor 62 which is in turn configured to monitor electrical resistance change in one or more of the read/write head elements. In another embodiment any one or more of the head elements may be coupled to the laser power monitor to provide an electrical resistance change in response to thermal fluctuations in the read/write head 30. The laser power monitor may be configured to calculate laser power as a function of electrical resistance change. In certain embodiments the laser power monitor 62 may report the power of the laser light 304 to the controller unit 50 which in turn may increase or decrease electrical current to the laser. In another embodiment, the laser power monitor 62 may report the power of the laser light 304 to the host system 70 so that appropriate action may be taken such as replacing the laser 302.

Figure 4:
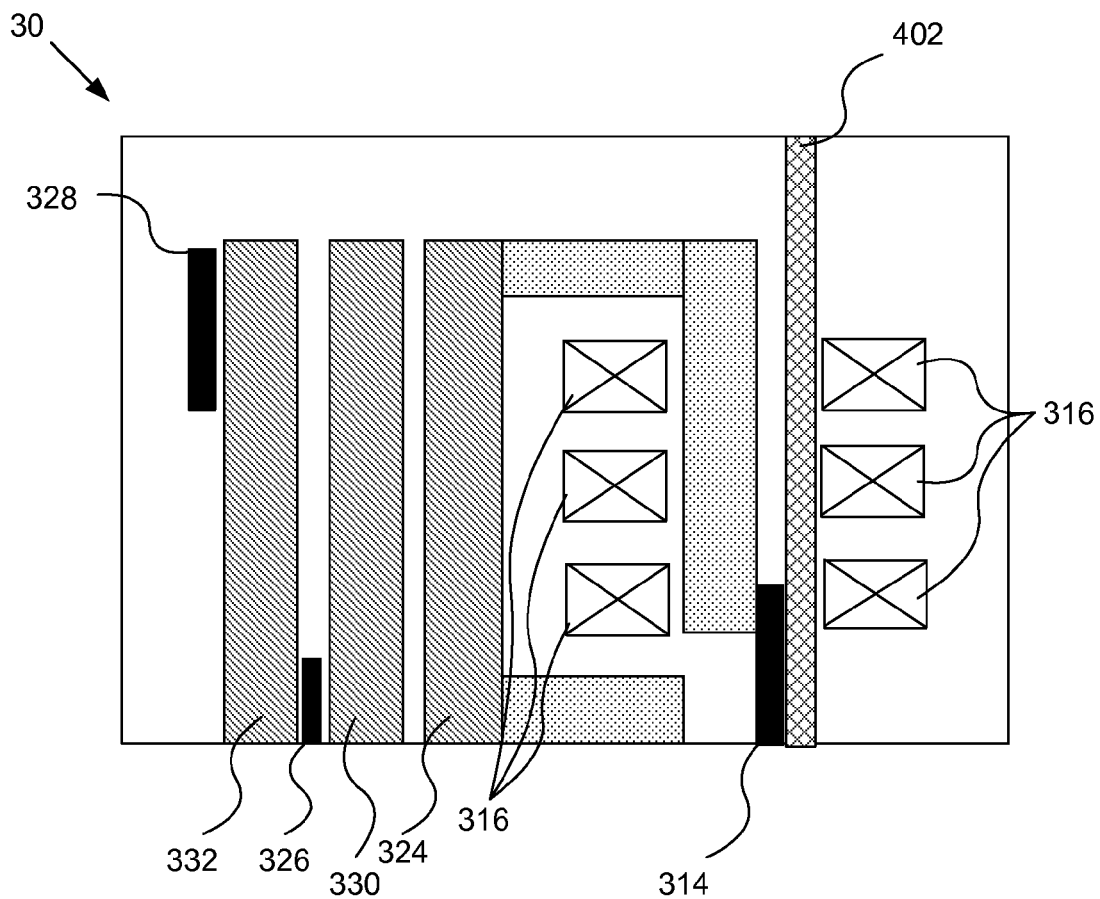
FIG. 4 is a cutaway view of a read/write head including a waveguide in accordance with one embodiment of the present invention.

FIG. 4 illustrates a block diagram according one embodiment of the current invention. In one embodiment, the write coil 316 may be disposed around a laser light waveguide 402 and may be configured to surround the waveguide 402. The waveguide 402 may be disposed through the center of the write coil 316 and adjacent to the write pole 314. In certain embodiments the write pole 314 may be arranged such that the write pole 314 partially blocks the laser light 304 in the waveguide 402.

The waveguide 402 may be configured to convey laser light 304 from the laser 302 to the hotspot 308 on the magnetic recording medium 12. The waveguide 402 may comprise a dielectric material that will convey the laser light 304 without absorbing heat.

Figure 5:
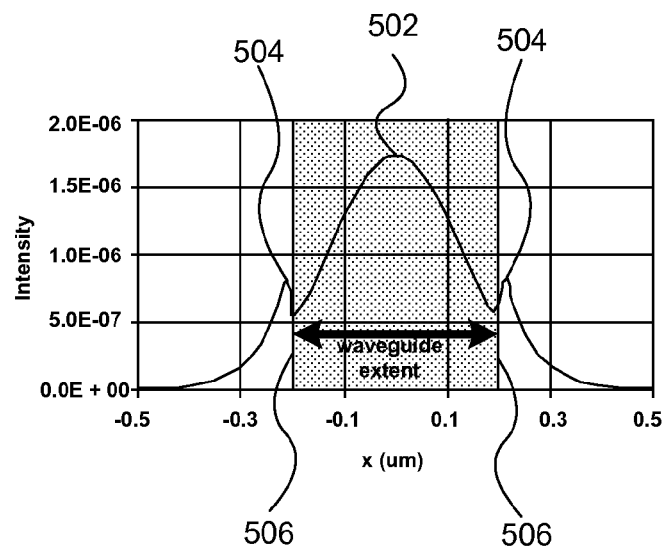
FIG. 5 is a laser light intensity plot across a waveguide in accordance with one embodiment of the present invention.

FIG. 5 illustrates laser light intensity across one embodiment of a waveguide 402. Laser light intensity is at its maximum 502 at the center of the waveguide 402 and tapers off toward the edges 506 of the waveguide. As shown in FIG. 5, the laser light intensity is generally not zero immediately outside waveguide, but exhibits tails 504. A metallic element, such as write pole 314 or other metallic object disposed adjacent to the waveguide 402 absorbs the laser light 304 of tails 504 and converts the laser light 304 into heat.

Figure 6:
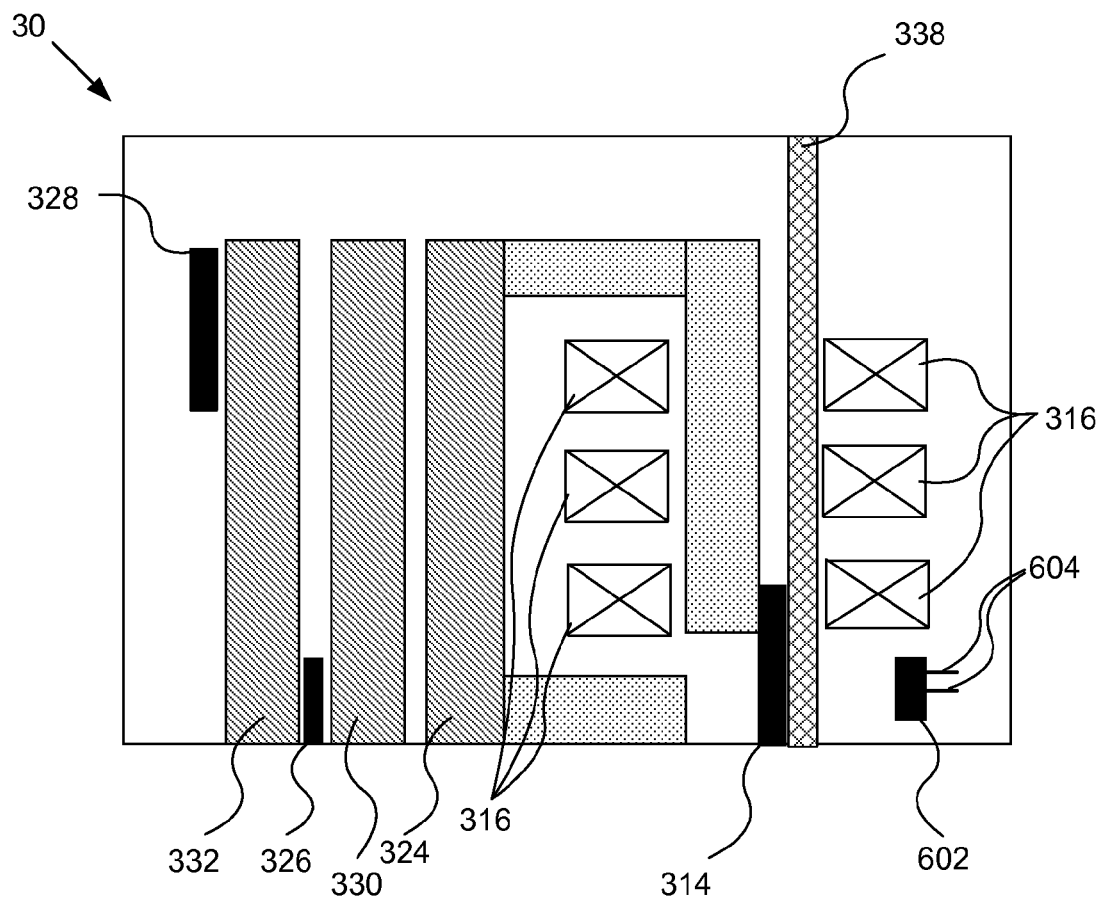
FIG. 6 is a cutaway view of a read/write head including a heat absorbing sensor in accordance with one embodiment of the present invention.
Figure 7A:
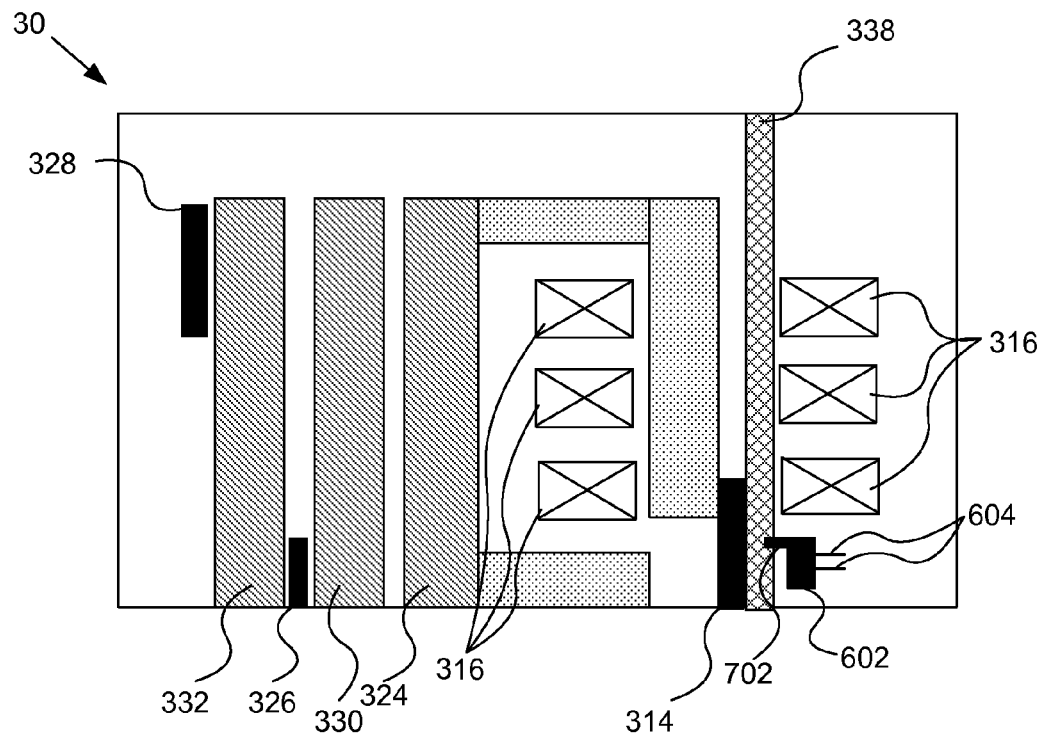
FIG. 7a, is a cutaway view of a read/write head including a heat absorbing sensor with a finger in accordance with one embodiment of the present invention.

Turning now to FIG. 6, a heat absorbing sensor 602 may be disposed within the read/write head 30, in certain embodiments. The heat absorbing sensor 602 may be coupled to heat absorbing sensor electrical leads 604. In one embodiment, the heat absorbing sensor 602 may be positioned in close enough proximity to the waveguide 402 to absorb a tail 504 of laser light 304. In certain embodiments the heat absorbing sensor 602 may be disposed in close proximity to the write pole 314 to absorb heat from the write pole 314. Thus, as the write pole 314 absorbs laser light 304 and heats up, the heat absorbing sensor 602 may also heat up. As heat increases in the heat absorbing sensor 602, the electrical resistance to the heat absorbing sensor electrical leads 604 may increased. The heat absorbing sensor electrical leads 604 may be coupled to the laser power monitor 62. The laser power monitor 62 may sense electrical resistance changes in the heat absorbing sensor electrical leads 604. The laser power monitor 62 may calculate laser power as a function of electrical resistance in the heat absorbing sensor electrical leads 604. In certain embodiments, the laser power monitor 62 reports the power of the laser light 304 to the controller unit 50 which in turn may increase or decrease electrical current to the laser 302. In another embodiment, the laser power monitor 62 reports the power of the laser light 304 to the host system 70 so that appropriate action may be taken such as replacing the laser 302. For example, the power of the laser light 304 detected by the laser power monitor 62 may be very low or zero indicating that the laser 302 is inoperative. In one embodiment, such as the embodiment illustrated in FIG. 7a the heat absorbing sensor 602 may include a finger 702. The finger 702 may comprise a thermal conductive material such as metal. The finger 702 may connect to or be intergrated with the heat absorbing sensor 602. The finger 702 may partially extend into the waveguide 402 to absorb laser light 304.

Figure 7B:
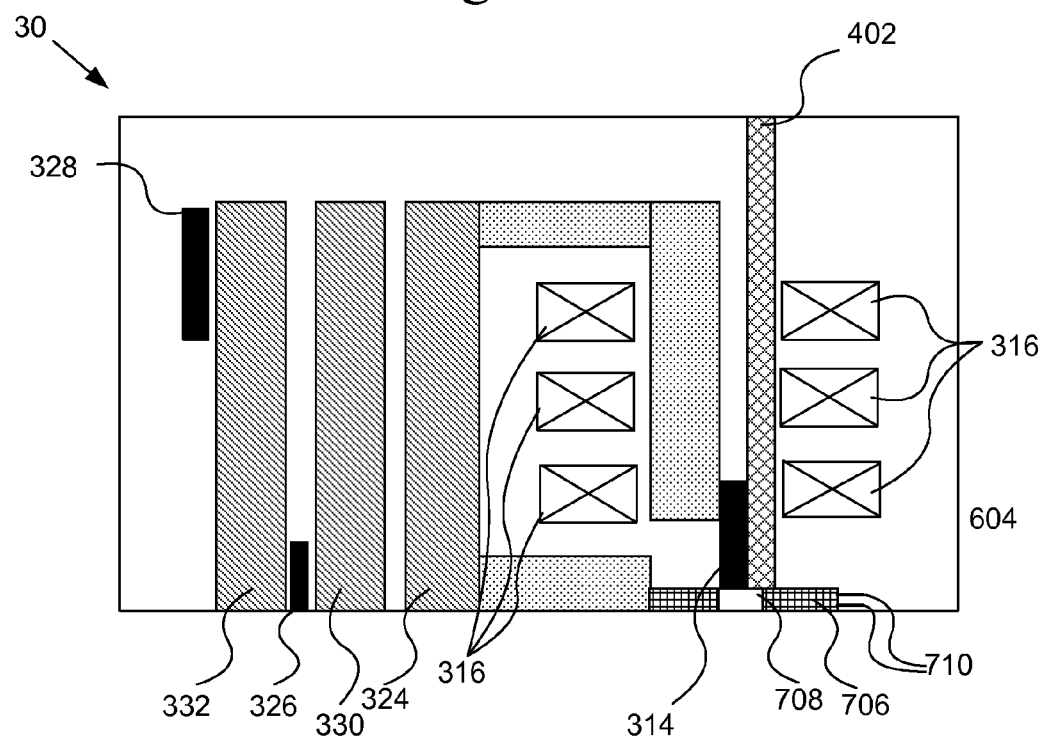
FIG. 7b, is a cutaway view of a read/write head including a near-field aperture in accordance with one embodiment of the present invention.

FIG. 7b illustrates a read/write head 30 with a near-field aperture structure 706 according to one embodiment of the current invention. In certain embodiments the waveguide 402 may propagate laser light 304 several hundred nanometers in diameter to a hotspot 308 (see FIG. 3) on the magnetic recording disk 12. To narrow the laser light 304, a near-field aperture structure 706 is positioned in close proximity to the magnetic write pole 314. In certain embodiments, the near-field aperture structure 706 is disposed around the write pole 314. A dielectric material may be disposed within a void 708 in the aperture structure 706 and around the write pole 314. The dielectric material may comprise a material with a high optical index of refraction to allow the propagation of light through the aperture structure 706. In certain embodiments of the current invention, the void 708 of the near-field aperture structure 706 is filled with a transparent material such that laser light 304 propagates through the transparent material. As laser light 304 propagates to the surface of the aperture structure 706 through the wave guide 402, some laser light 304 is absorbed by and heats the aperture structure 706. The laser light that passes through the near-field aperture structure 706 is narrowed due to the structure of the near-field aperture. The resulting laser light 304 passing through the aperture structure 706 is narrowed to about 30 to 50 nanometers in diameter. The shape of the void 708 disposed within the aperture structure 706 may be C-shaped, square, rectangular, circular or any other shape as is known in the art. In certain embodiments the void 706 in the near-field aperture structure 706 may not contain a dielectric material or transparent material but rather may be empty.

According to one embodiment of the current invention, aperture structure electrical leads 710 may be electrically coupled to the near-field aperture structure 706 at one end, and the laser intensity monitor 62 at the other end. As laser light 304 is absorbed by the near-field aperture structure 706 and one or more other elements of the read/write head, the temperature of the near-field aperture structure 706 rises. As the temperature increases in the near-field aperture structure 706, the electrical resistance to the aperture structure electrical leads 710 increases. The laser intensity monitor 62 senses electrical resistance changes in the aperture structure electrical leads 710. The laser intensity monitor 62 calculates laser intensity as a function of electrical resistance in the aperture structure electrical leads 610.

In certain embodiments, the laser intensity monitor 62 reports the intensity of the laser light 304 to the controller unit 50 which in turn increases or decreases electrical current to the laser 302. In another embodiment, the laser intensity monitor 62 reports the intensity of the laser light 304 to the host system 70 so that appropriate action may be taken such as replacing the laser 302. For example, the intensity of the laser light 304 detected by the laser intensity monitor 62 may be very low or zero indicating that the laser 302 is inoperative.

Figure 8:
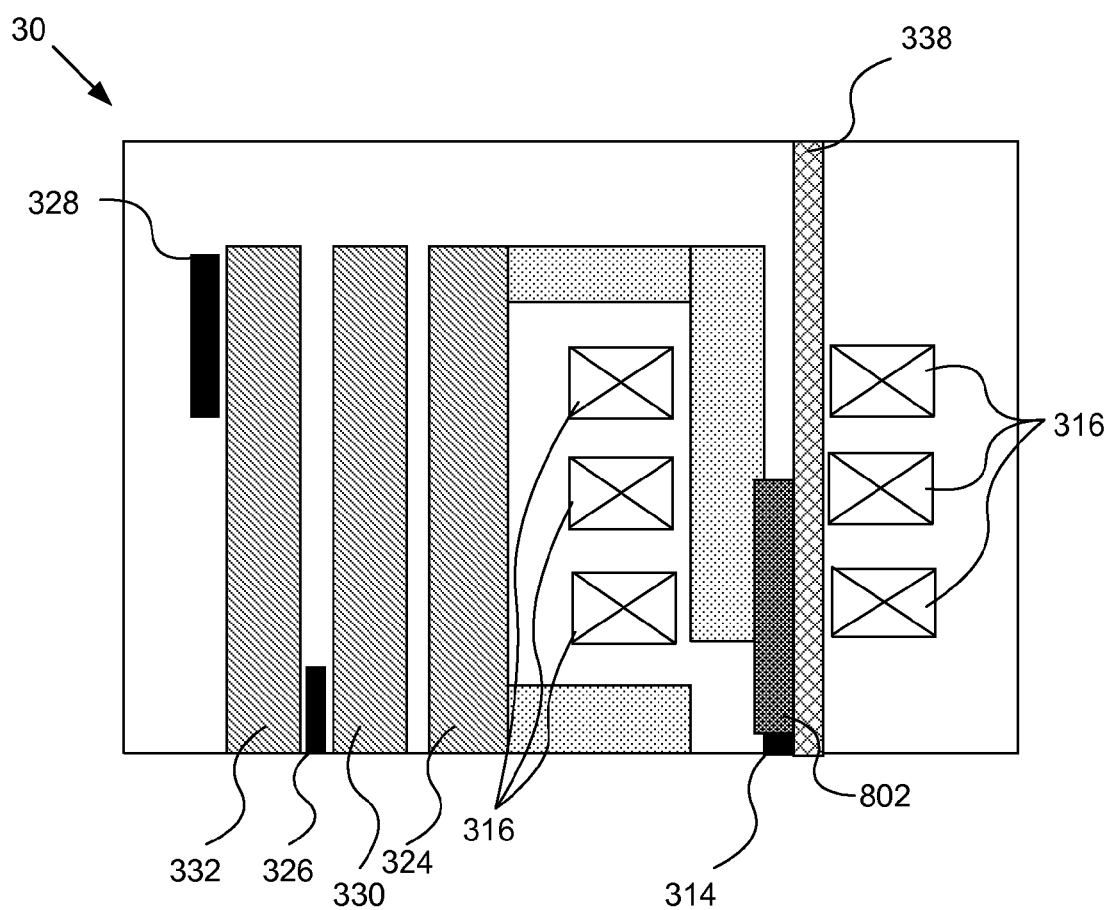
FIG. 8 is a cutaway view of a read/write head including a heat pipe in accordance with one embodiment of the present invention.

FIG. 8 illustrates a schematic block diagram according to one embodiment of the current invention. A heat pipe 802 is positioned around the write pole 314 in certain embodiments. The heat pipe 802 conducts heat from the write pole 314 or hotspot 308 to the write coil 316 or other electrically coupled head element. In one embodiment the heat pipe conducts heat from the near-field aperture structure 706 to the write coil 316 or other electrically coupled head element. The heat pipe 802 may comprise a heat conductive element such as copper or other metallic material.

In one embodiment, in operation a read/write head element measures a first electrical resistance of one or more read/write head elements when the slider 32 is on a load/unload ramp. A laser 302 heats the head elements either directly or indirectly. The head element measures a second electrical resistance of the head element at regular intervals when the slider 32 is on the load/unload ramp. When the electrical resistance measurements are conducted when the slider 32 is on the load/unload ramp there is no cooling from the disk and air bearing so temperature rise per unit of laser power is maximized.

In another embodiment the electrical resistance measurements are conducted while the slider 32 and read/write head 30 are flying on the disk. Temperature sensitivity is reduced due to cooling of the air bearing on the disk. This embodiment can provide a continuous or nearly continuous monitoring of laser power.

Figure 9:
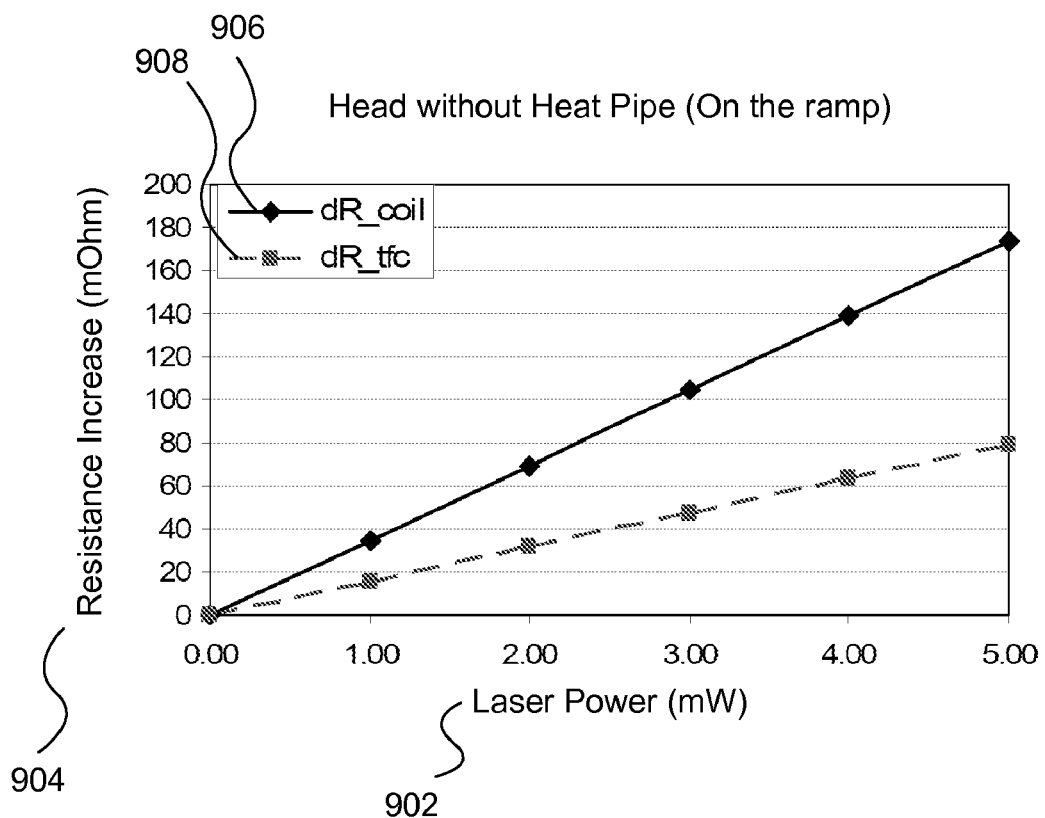
FIG. 9 is a plot illustrating the correlation between laser power and electrical resistance of read/write head without a heat pipe in accordance with one embodiment of the current invention.

FIG. 9 is a graphical illustration of electrical resistance calculations at regular intervals with the read/write head 30 on the ramp. The embodiment illustrated in FIG. 9 does not utilize a heat pipe 802. As laser power 902 is increased along the x axis, the electrical resistance 904 in the head element increases along the y axis. Line 906 illustrates electrical resistance change in the write coil 316 as a function of laser power. Line 908 illustrates electrical resistance change in the TFC heater 328 as function of laser power. The difference in the slope of lines 906 and 908 may be due to the greater physical distance of the TFC heater 328 from the write pole 314. In certain embodiments the TFC heater 328 may be positioned closer to the write pole 314 such that the TFC heater 328 may absorb more heat and at a faster rate than the illustrated embodiment. This graph illustrates that electrical resistance rise is proportional to the power of the laser. The write coil 316 has an electrical resistance increase approximately 2.25 times the electrical resistance of the TFC heater 328. The electrical resistance of the write coil 316 when the write coil 316 is cold is about 3.5Ω, the electrical resistance of the TFC heater 328 when the TFC heater 328 is cold is about 120Ω.

Figure 10:
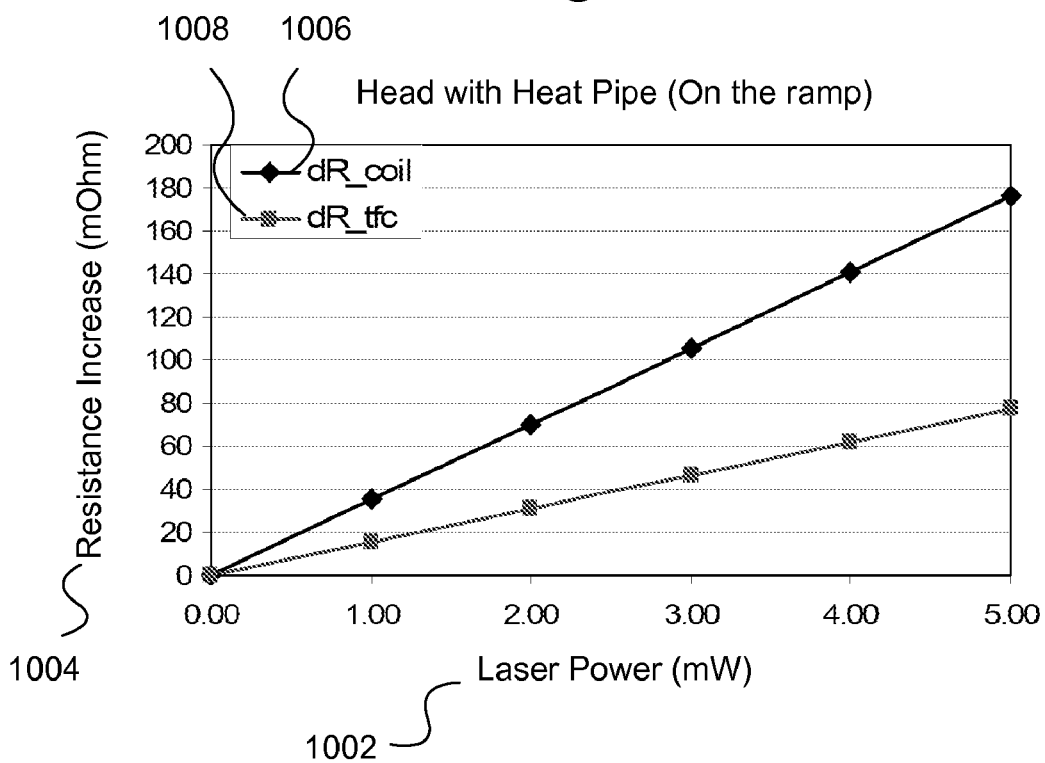
FIG. 10 is a plot illustrating the correlation between laser power and electrical resistance of read/write head with a heat pipe in accordance with one embodiment of the current invention.

FIG. 10 is another graphical illustration of electrical resistance calculations at regular intervals with the read/write head 30 on the ramp. In contrast to FIG. 9, the embodiment illustrated in FIG. 10 utilizes a heat pipe 802. As laser power 1002 is increased along the x axis, the electrical resistance 1004 in the head element increases along the y axis. Line 1006 illustrates electrical resistance change in the write coil 316 as a function of laser power. Line 1008 illustrates electrical resistance change in the TFC heater 328 as function of laser power. The difference in the slope of lines 1006 and 1008 may be due to the greater distance of the TFC heater 328 from the write pole 314. In certain embodiments the TFC heater 328 may be disposed closer to the write pole 314 so that the TFC heater 328 absorbs more heat and at a faster rate. This graph illustrates that electrical resistance rise is proportional to power of the laser. The write coil 316 has an electrical resistance increase approximately 2.25 times the electrical resistance of the TFC heater 328. The electrical resistance of the write coil 316 when the write coil 316 is cold is about 3.5Ω, the electrical resistance of the TFC heater 328 when the TFC heater 328 is cold is about 120Ω.

Figure 11:
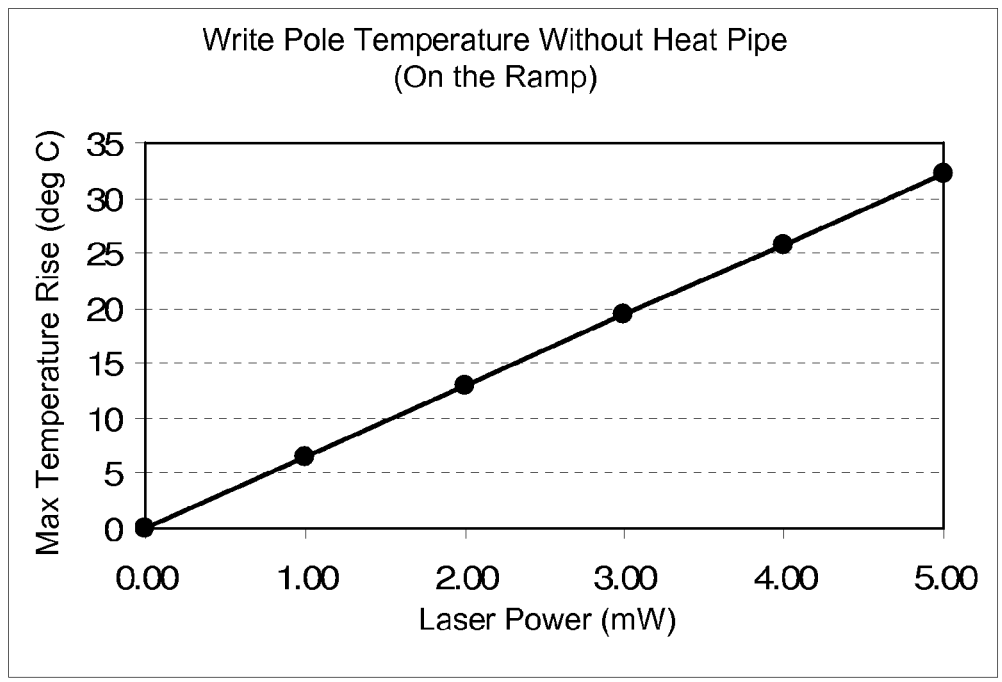
FIG. 11 is a plot illustrating the correlation between laser power and temperature of the write pole without a heat pipe in accordance with one embodiment of the current invention.

FIG. 11 is a graphical illustration of temperature rise as the laser 302 heats the write pole 314. The temperature calculations occur at regular intervals with the read/write head 30 on the ramp. The embodiment illustrated in FIG. 11 does not utilize a heat pipe 802. This graph illustrates that temperature rises at the write pole 314 is proportional to laser power. The temperature rise of the write pole 314 is about 6.4° C./1 mW of power absorbed from the laser light 304. Absorbed power is expected to be in the 1-100 mW range.

Figure 12:
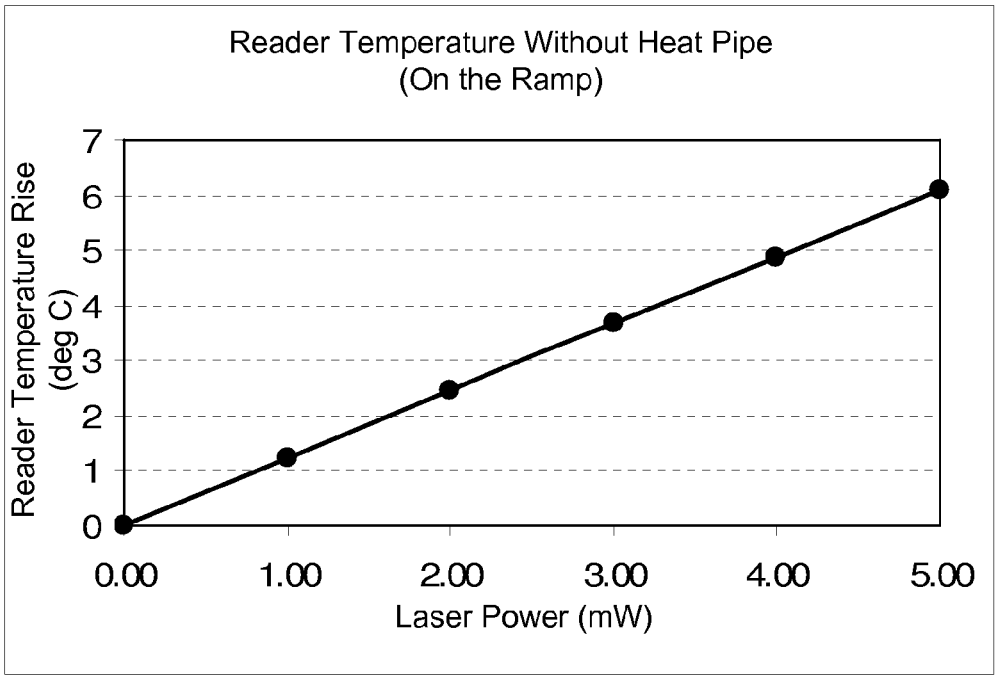
FIG. 12 is a plot illustrating the correlation between laser power and temperature of the reader without a heat pipe in accordance with one embodiment of the current invention.

FIG. 12 is a graphical illustration of temperature rise calculations at the read element 326 as the laser 302 heats the read element 326. The temperature calculations occur at regular intervals with the read/write head 30 on the ramp. The embodiment illustrated in FIG. 12 does not utilize a heat pipe 802. This graph illustrates that temperature rises at the read element 326 is proportional to laser power. The temperature rise of the read element 326 is about 1.2° C./1 mW of power absorbed from the laser light 304. Absorbed power is expected to be in the 1-100 mW range.

Figure 13:
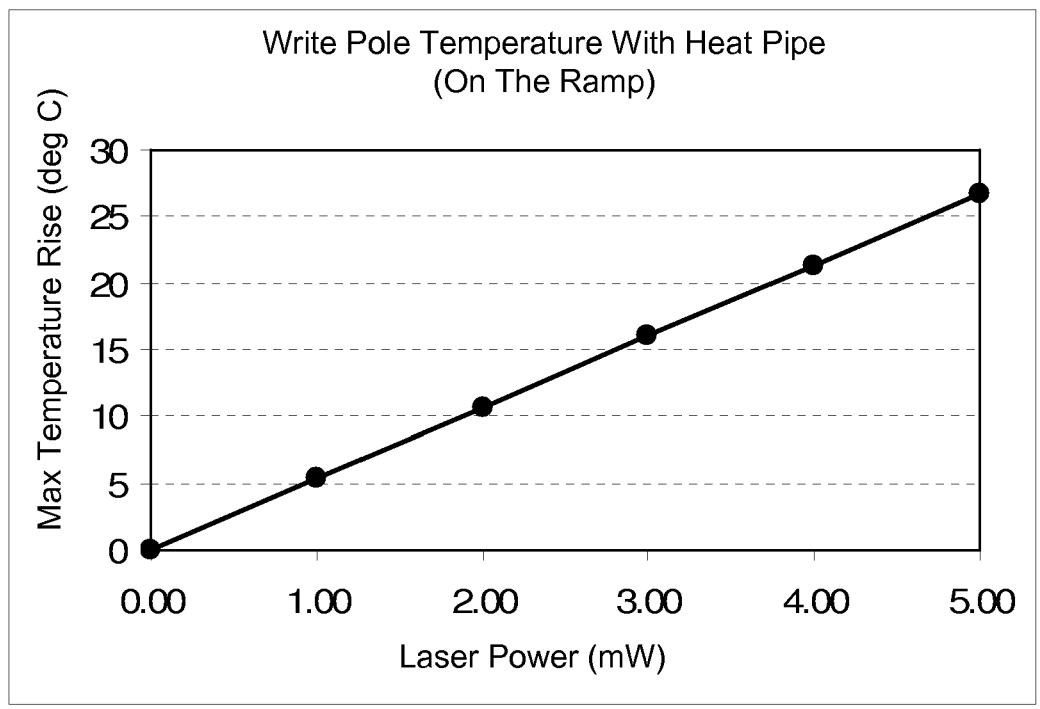
FIG. 13 is a plot illustrating the correlation between laser power and temperature of the write pole with a heat pipe in accordance with one embodiment of the current invention.

FIG. 13 is a graphical illustration of temperature rise calculations at the write pole 314 as the laser 302 heats the write pole 314. The temperature calculations occur at regular intervals with the read/write head 30 on the ramp. The difference between FIG. 11 and the embodiment illustrated in FIG. 13 is FIG. 13 does utilize a heat pipe 802. This graph illustrates that temperature rises at the write pole 314 is proportional to laser power. The temperature rise of the write pole 314 is about 5.3° C./1 mW of power absorbed from the laser light 304. This is lower than where a heat pipe 802 is not utilized.

Figure 14:
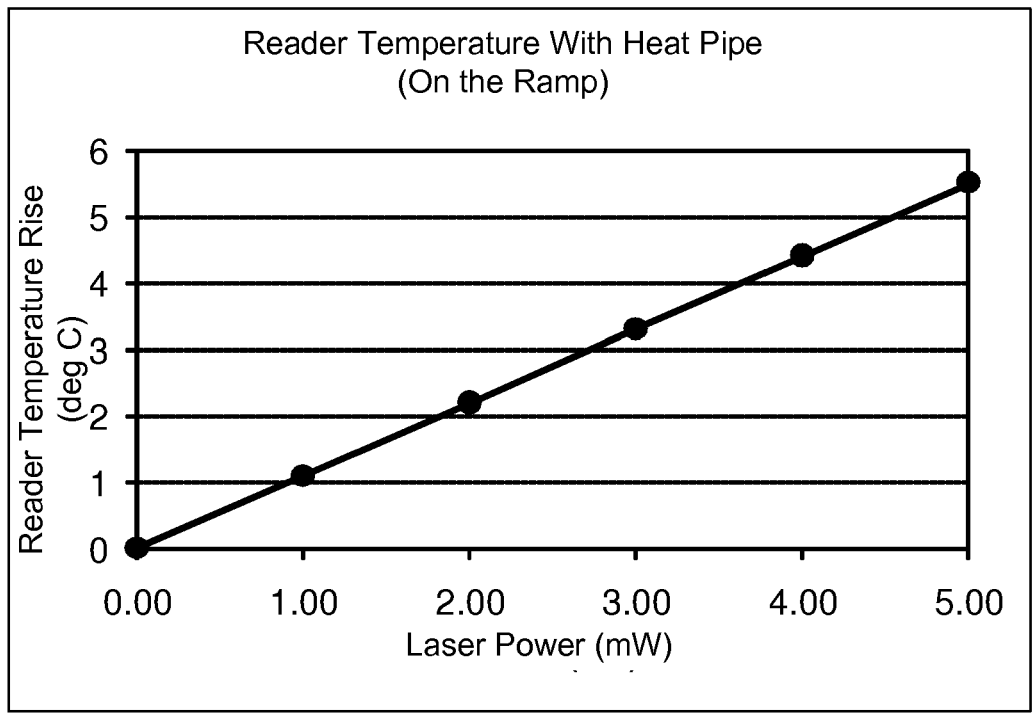
FIG. 14 is a plot illustrating the correlation between laser power and temperature of the reader with a heat pipe in accordance with one embodiment of the current invention.

FIG. 14 is a graphical illustration of temperature rise calculations at the read element 326 at regular intervals with the read/write head 30 on the ramp. The difference between FIG. 12 and the embodiment illustrated in FIG. 14 is FIG. 14 does utilize a heat pipe 802. This graph illustrates that temperature rises at the read element 326 is proportional to laser power. The temperature rise of the read element 326 is about 1.1° C./1 mW of power absorbed from the laser light 304. This is lower than where a heat pipe 802 is not utilized.

Figure 15:
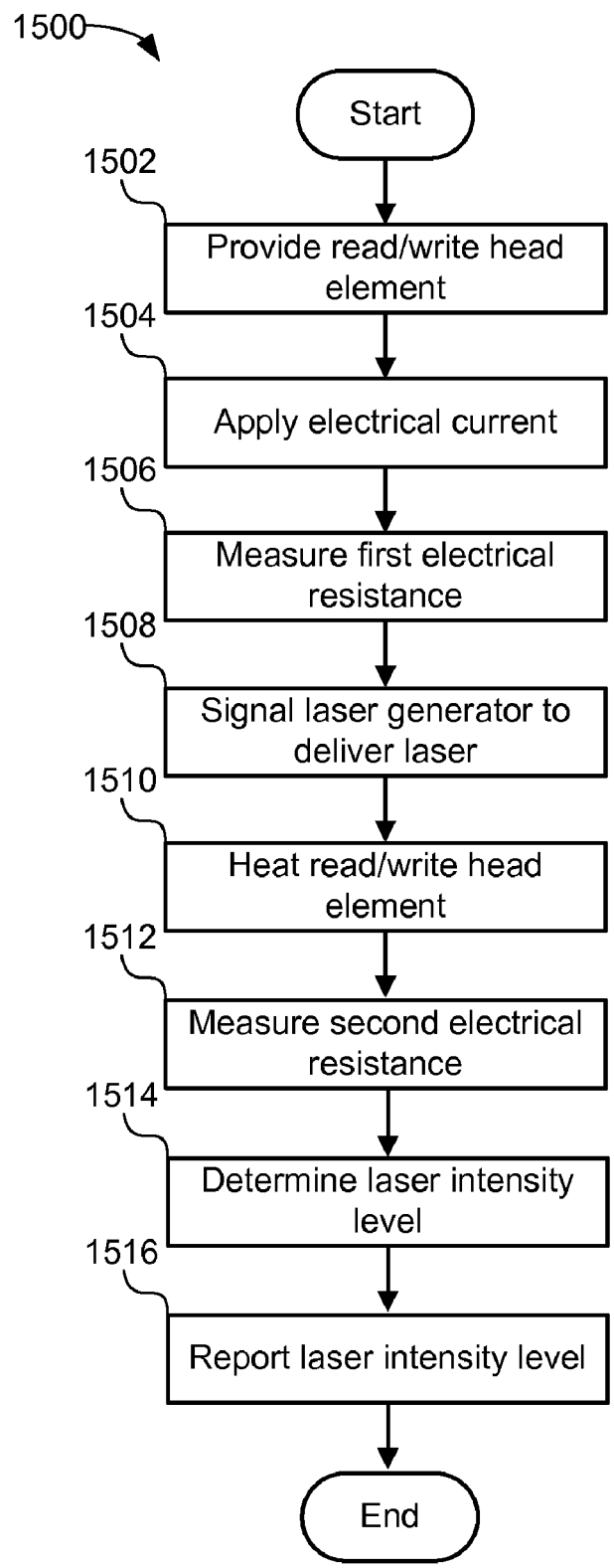
FIG. 15 is a flow chart for monitoring laser light power in accordance with one embodiment of the current invention.

FIG. 15 is a flow chart of an embodiment of one possible method 1500 of monitoring the power of laser light 304. A read/write head element is provided 1502 and coupled to an electrical lead, the electrical lead is coupled to laser power monitor 62. The read/write head element may comprise a write coil 316, a read element 326, TFC heater 328, heat absorbing sensor 602 or other electrically coupled head element. An electrical current is applied 1504 to the electrical leads coupled to the read/write head element. A first electrical resistance is measured 1506 in the read/write head element. A laser 302 is signaled 1508 to generate laser light 304. The read/write head element is heated 1510 by laser light 304. The read/write head element may be directly heated by the laser light 304 or the read/write head element may be heated by a tail 504 of laser light. A second electrical resistance is measured 1512 in the read/write head element. The power of laser light 304 is determined 1514. The laser power may be reported 1516 to the read/write channel 58.

In certain embodiments the measurement of the first electrical resistance 1506 and the measurement of the second electrical resistance 1512 may be measured at regular intervals when the slider 32 is on the load/unload ramp. In one embodiment the measurement of the first electrical resistance 1506 and the measurement of the second electrical resistance 1512 may be measured at regular intervals when the slider 32 is flying over the magnetic recording medium 12. In one embodiment the measurement of the first electrical resistance 1506 and the measurement of the second electrical resistance 1512 may be measured continuously while the slider 32 is flying over the magnetic recording medium 12.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for monitoring laser power for thermally assisted recording on magnetic media, the apparatus comprising:
    a laser that delivers a laser light to a head element and a hotspot on a rotational magnetic medium, a first portion of the laser light contacting the head element to heat the head element and a second portion of the laser light contacting the hotspot to heat the hotspot, wherein the first portion of the laser light is prevented from contacting the hotspot by the head element;
    wherein the head element is coupled to an electrical lead, the head element registering an electrical resistance change to electricity flowing through the electrical lead and head element in response to a temperature change in the head element produced by the head element absorbing a portion of the laser light before the laser light is delivered to the rotational magnetic medium;
    a measurement module coupled to the electrical lead, the measurement module measuring the electrical resistance change; and
    a determination module that determines a power level of the laser in response to the electric resistance change.

2. The apparatus according to claim 1 further comprising a write pole disposed adjacent to a path of the laser light, the temperature change varying in response to the write pole absorbing a tail of the laser light.

3. The apparatus according to claim 2 wherein the write pole is disposed adjacent to the hotspot on the rotational magnetic medium.

4. The apparatus according to claim 1 wherein the laser light heats the head element and the hotspot substantially concurrently.

5. The apparatus according to claim 2 further comprising a heat pipe disposed adjacent to the write pole, the heat pipe configured to collect heat from a tail of the laser light and conduct the heat to the head element.

6. The apparatus according to claim 1 wherein the head element comprises a write coil.

7. The apparatus according to claim 1 wherein the head element comprises a reader.

8. The apparatus according to claim 1 wherein the head element comprises a thermal fly height control heater.

9. The apparatus according to claim 1 wherein the head element comprises a near-field aperture structure.

10. The apparatus according to claim 1, further comprising;
    an actuator arm;
    a slider secured to the actuator arm;
    a read/write head attached to the slider, the actuator arm configured to selectively position the read/write head over the rotational magnetic medium, the rotational magnetic medium configured to bear perceivable information; and
    a interface module configured to report the power of the laser light in response to a request.

11. The apparatus according to claim 10 further comprising a dielectric waveguide, the waveguide configured to heat the read/write head by way of a laser tail emanating from the waveguide in response to a laser pulse.

12. An apparatus for monitoring laser power for thermally assisted recording on magnetic media, the apparatus comprising:
    a rotational magnetic medium configured to bear perceivable information;
    an actuator arm;
    a slider secured to the actuator arm;
    a read/write head attached to the slider, the actuator arm configured to selectively position the read/write head over the rotational magnetic medium;
    a laser configured to deliver a laser light to a write pole and a hotspot on the rotational magnetic medium, the laser light contacting the write pole and the hotspot to heat the write pole and the hotspot;
    wherein the write pole is coupled to an electrical lead, the write pole registering an electrical resistance change to electricity flowing through the electrical lead and the write pole in response to a temperature change produced by the laser light heating the write pole before the laser light is delivered to the rotational magnetic medium;
    a measurement module coupled to the electrical lead, the measurement module configured to measure the electrical resistance change;
    a determination module configured to determine a power level of the laser in response to the electric resistance change; and
    a interface module configured to report the power of the laser light in response to a diagnostic test.

13. The apparatus according to claim 12 further comprising a dielectric waveguide, the waveguide configured to propagate the laser light from the laser to the hotspot without absorbing heat.

14. The apparatus according to claim 13 wherein the write pole is disposed adjacent to the waveguide, the write pole configured to absorb a tail of laser light.

15. An apparatus for monitoring laser power for thermally assisted recording on magnetic media, the apparatus comprising:
    a rotational magnetic medium configured to bear perceivable information;

an actuator arm;
a slider secured to a distal end of the actuator arm;
a read/write head attached to the slider, the actuator arm configured to selectively position the read/write head over the rotational magnetic medium;
a laser configured to emit a laser light;
a dielectric waveguide, the waveguide configured to deliver a first portion of the laser light to a hotspot on the rotational magnetic medium and a second portion of the laser light to a head element on the read/write head, the first portion of the laser light contacting the hotspot to heat the hotspot, the second portion of the laser light contacting the head element to heat the read/write head, the second portion of the laser light contacting the head element before the laser light is delivered to the rotational magnetic medium;
a write pole disposed adjacent to the waveguide;
a write coil coupled to an electrical lead, the write coil configured to register an electrical resistance change to electricity flowing through the electrical lead and write coil in response to a temperature change produced by the second portion of the laser light contacting the head element;
a heat pipe disposed adjacent to the write coil, the heat pipe configured to collect heat from the head element of the read/write head and conduct the heat to the write coil;
a measurement module coupled to the electrical lead, the measurement module configured to measure the electrical resistance change;
a determination module configured to determine an power level of the laser in response to the electric resistance change; and
a interface module configured to report the power of the laser light in response to a diagnostic test.

16. The apparatus of claim 15 further comprising:
a plurality of electrical leads;
a reader coupled to the plurality of electrical leads, the reader registering a measurable electric resistance change to the plurality of electrical leads in response to a temperature change; and
a thermal fly height control heater coupled to the plurality of electrical leads, the thermal fly height control heater registering a measurable electric resistance change to the plurality of electrical leads in response to a temperature change.

17. The apparatus of claim 16 wherein the measurement module is further coupled to the plurality of leads coupled to the reader and the thermal fly height control heater.

18. A method for determining a laser power output for thermally assisted recording on magnetic media, the method comprising:
providing a head element of a read/write head, wherein the head element is coupled to an electrical lead of a read/write head;
signaling a laser generator to deliver a first portion of a laser light to a hotspot on a rotational magnetic medium;
delivering the first portion of the laser light to the hotspot on the rotational magnetic medium, the first portion of the laser light contacting the hotspot to heat the hotspot;
delivering a second portion of the laser light to the head element, the second portion of the laser light contacting the head element to heat the head element, wherein the second portion of the laser light is delivered to the head element before the first portion of the laser light is delivered to the rotational magnetic medium;
measuring an electrical resistance change at the electrical lead coupled to the read/write head; and
determining a power level of the laser light based on the electric resistance change.

19. The method according to claim 18 wherein the first electrical resistance measurement and the second electrical resistance measurement are performed at a regular time interval with a slider on a load/unload ramp, the slider comprising the read/write head element and the laser generator.

20. The method according to claim 18 wherein the electrical resistance change measurement is performed at a regular time interval with a slider flying over the rotational magnetic medium, the rotational magnetic medium configured to bear perceivable information, the slider comprising the read/write head element and the laser generator.

21. The method according to claim 18 wherein a measurement module registers the electrical resistance change measurement continuously as a slider flies over the rotational magnetic medium, the rotational magnetic medium configured to bear perceivable information, the slider comprising the read/write head element and the laser generator.

22. An apparatus for monitoring laser intensity for thermally assisted recording on magnetic media, the apparatus comprising:
a rotational magnetic medium configured to bear perceivable information;
an actuator arm;
a slider secured to a distal end of the actuator arm;
a read/write head secured to a distal end of the slider, the actuator arm configured to selectively position the read/write head over the rotational magnetic medium;
a laser delivering a laser light to a hotspot on the rotational magnetic medium and to a head element of the read/write head, the laser light contacting the head element and the hotspot to heat the head element and the hotspot;
a near-field aperture structure positioned in close proximity to a write pole of the read/write head and within a path of the laser light, the near-field aperture structure configured to focus the laser light on the hotspot;
an electrical lead coupled to the near-field aperture structure, the near-field aperture structure registering a electrical resistance change to electricity flowing through the electrical lead and the near-field aperture structure in response to a temperature change produced at least in part by the laser light absorbed by the near-field aperture structure before the laser light is delivered to the rotational magnetic medium;
a measurement module coupled to the electrical lead, the measurement module configured to measure the electrical resistance change;
a determination module configured to determine an intensity level of the laser in response to the electric resistance change; and
a interface module configured to report the intensity of the laser light in response to a diagnostic test.

23. The apparatus according to claim 22 wherein the laser light delivered to the hotspot is about 30 nm to about 50 nm in diameter.

24. The apparatus according to claim 22 further comprising an transparent material disposed within a void of the near-field aperture structure, the laser light propagating through the transparent material.

25. The apparatus according to claim 22, wherein the near-field aperture structure further comprises a void disposed within the near-field aperture structure, the laser light propagating through the void.

* * * * *

UNITED STATES PATENT AND TRADEMARK OFFICE
CERTIFICATE OF CORRECTION

PATENT NO. : 8,406,090 B2
APPLICATION NO. : 12/042230
DATED : March 26, 2013
INVENTOR(S) : Jia-Yang Juang et al.

It is certified that error appears in the above-identified patent and that said Letters Patent is hereby corrected as shown below:

In the Specifications:

Column 6, Lines 30-40
    Lines 30-40 should be one paragraph instead of separated into two paragraphs as follows:

-- Figures 1 and 2 show schematic diagrams of one embodiment of a data storage system in which the present invention may be deployed, which is generated by the general reference number 10. The system 10 may include a plurality of magnetic recording disks 12. Each disk 12 may have a plurality of concentric data tracks. The disks 12 are typically mounted on a spindle motor shaft 14, which may connect to a spindle motor 16. The motor 16 is typically mounted to a chassis 18. The disks 12, spindle 14, and motor 16 form a disk stack assembly 20. --.

In the Claims:

Column 14, Line 22
    "a interface module" should read "an interface module"

Column 14, Line 54
    "a interface module" should read "an interface module"

Column 15, Line 30
    "determine an power" should read "determine a power"

Column 15, Line 33
    "a interface module" should read "an interface module"

Signed and Sealed this
Twenty-first Day of May, 2013

Teresa Stanek Rea
*Acting Director of the United States Patent and Trademark Office*

Column 16, Lines 39-40
"registering a electrical" should read "registering an electrical"

Column 16, Line 52
"a interface module" should read "an interface module"

Column 16, Line 58
"an transparent material" should read "a transparent material"